United States Patent [19]

Wertheim et al.

[11] Patent Number: 4,525,633
[45] Date of Patent: Jun. 25, 1985

[54] WIND TURBINE MAXIMUM POWER TRACKING DEVICE

[75] Inventors: Max M. Wertheim; Richard J. Herbermann, both of Huntington, N.Y.

[73] Assignee: Grumman Aerospace Corporation, Bethpage, N.Y.

[21] Appl. No.: 425,760

[22] Filed: Sep. 28, 1982

[51] Int. Cl.³ .............................. F03D 9/02; H02P 9/14
[52] U.S. Cl. ........................................... 290/44; 322/35
[58] Field of Search ........................ 290/44, 55; 322/35

[56] References Cited

U.S. PATENT DOCUMENTS

| | | | |
|---|---|---|---|
| 4,177,414 | 12/1979 | Roesel, Jr. et al. | 322/28 |
| 4,198,572 | 4/1980 | Kant | 290/44 |
| 4,228,361 | 10/1980 | Jacobs et al. | 290/44 |
| 4,331,881 | 5/1982 | Soderholm et al. | 322/35 |
| 4,421,967 | 12/1983 | Birbel et al. | 322/35 |

Primary Examiner—William M. Shoop
Assistant Examiner—Shelley Wade
Attorney, Agent, or Firm—Morgan, Finnegan, Pine, Foley & Lee

[57] ABSTRACT

A method and apparatus for controlling the level of power transferred through a stand-alone wind power generating system utilizing a wind turbine whose output is converted to electrical power by means of an induction generator are disclosed. In the disclosed system, the velocity of the wind incident upon the blade of the turbine is sensed by a velocity sensor. This information is then used to vary the excitation frequency applied to the generator to adjust the shaft speed of the turbine in proportion to the change in wind velocity. The excitation frequency is adjusted in accordance with a control algorithm so that the power output of the system is equal to a maximum fraction of available wind power at wind velocities below a pre-determined power/velocity point.

18 Claims, 3 Drawing Figures

WIND TURBINE MAXIMUM POWER TRACKING DEVICE

BACKGROUND OF THE INVENTION

This invention relates to wind power systems, and more particularly to a method and apparatus for controlling the level of power transferred through a stand-alone wind power generating system.

Wind power generating systems convert available wind power to electrical power. Many are stand-alone in that they are not connected to utility systems. Typically, such stand-alone systems incorporate large generators and large energy storage sub-systems to provide sufficient electrical energy during periods of low wind or no wind conditions. The cost of such equipment can, however, be somewhat expensive.

It has been found that maximizing the energy generated at low wind speeds is critical to system optimization, especially in minimizing energy storage size and cost. Often, in an effort to reduce the size of the generator and the energy storage sub-system such generating systems will incorporate blade pitch control so as to maximize the energy generated at low wind speeds. While this approach can result in a reduction of the size of the generator and storage sub-system, a problem arises in that this approach also severely limits turbine power transfer, causing the amount of the reduction to be limited.

SUMMARY OF THE INVENTION

Thus, the primary object of the present invention is to provide a method and apparatus for controlling the level of power transferred through a stand-alone wind power generating system so that the system constantly transfers a maximum fraction of available wind power.

Another object of the present invention is to provide a method and apparatus for controlling the level of power transferred through a stand-alone wind power generating system that utilizes a wind turbine whose output is converted to electrical power by means of an induction generator by varying the excitation frequency applied to the generator.

A further object of the present invention is to provide a method and apparatus for controlling the level of power transferred through a wind generating system which will allow the system's generator size and energy storage sub-system size to be significantly reduced.

THEORETICAL BACKGROUND

Wind turbines are designed to extract power from the wind. The power output of a wind turbine, based on an average wind velocity ($\bar{V}$), can be expressed as follows:

$$P_o = \frac{\rho}{2} C_p (\bar{V})^3 \quad (1)$$

where $\rho$ = air density, and $C_p$ = the power coefficient of the turbine.

The power coefficient, $C_p$, of any turbine is a function of the tip speed ratio of the turbine's blade. Thus, for any given blade design and pitch angle, $C_p$ is related to tip speed ratio, $\lambda$, by a curve which takes the approximate form shown in FIG. 1. It can be seen from this curve that there is one value of $\lambda$, defined as $\lambda_m$, at which a maximum power coefficient, defined as $C_{pm}$ occurs.

Tip speed ratio is defined as follows:

$$\lambda = \frac{R \omega}{V} \quad (2)$$

where R = blade radius, V = instantaneous wind velocity, $\omega = 2\pi N$, and N = turbine shaft velocity (rpm).

By substitution and rearrangement, equation (2) can be rewritten as:

$$\frac{N}{V} = \frac{\lambda}{2\pi R} \quad (3)$$

and, at $\lambda$ = constant = $\lambda_m$, $$\left.\frac{N}{V}\right|_{\lambda_m} = \kappa = \frac{\lambda_m}{2\pi R} \quad (4)$$

Thus, for any specific wind regime, where the tip speed ratio, $\lambda$ = a constant value = $\lambda_m$, $$\left. N \right|_{\lambda_m} = \kappa V \quad (5)$$

Equation (5) defines the relationship between the shaft velocity, N, of a wind turbine and the instantaneous wind velocity, V, incident upon the turbine when the tip speed ratio, $\lambda$, is held to a constant value equal to $\lambda_m$, the point at which a maximum power coefficient $C_{pm}$, and thus maximum turbine power output, is achieved. Equation (5) suggests that a wind generating system can constantly transfer a maximum fraction of available wind power for varying wind velocities by adjusting the turbine shaft velocity to track changes in the instantaneous wind velocity incident upon the turbine. As the turbine shaft velocity N is adjusted to track the changes in the instantaneous wind velocity V so as to maintain a predetermined ratio between the two variables, tip speed ratio $\lambda$ is held to a constant value equal to $\lambda_m$, the point at which a maximum power coefficient $C_p$ is achieved. Thus, maximum power output is always achieved.

SUMMARY OF THE SOLUTION

The present invention is directed toward a method and apparatus for controlling the level of power transferred through a stand-alone wind power generating system which uses a wind turbine whose output is converted to electrical power by means of an induction (asynchronous) generator. The present invention utilizes a variable excitation frequency to vary the shaft speed of the generator in response to wind velocity changes. The excitation frequency is indirectly controlled by a wind velocity sensor which senses changes in the velocity of the wind incident upon the turbine. As the velocity of the wind changes, the excitation frequency is adjusted proportionately to adjust the shaft speed of the generator. Since the generator is mechanically coupled to the wind turbine, adjustments in the shaft speed of the generator result in proportional adjustments in the shaft speed of the turbine. Thus, in essence, equation (5) is solved on a continuous basis to provide the necessary control for maximum power output for all wind velocity variations except wind gust variations that can not be tracked by the turbine/generator combination because of inertial constraints.

The present invention also uses a parasitic load for frictionless braking so as to avoid operation of the generating system at damaging, excessive wind speeds. The parasitic load is also used to dissipate any excess power generated by the system when the sum of external load power and energy storage device charge requirements is less than the total generated power.

DESCRIPTION OF THE PREFERRED EMBODIMENTS

Figure 1:
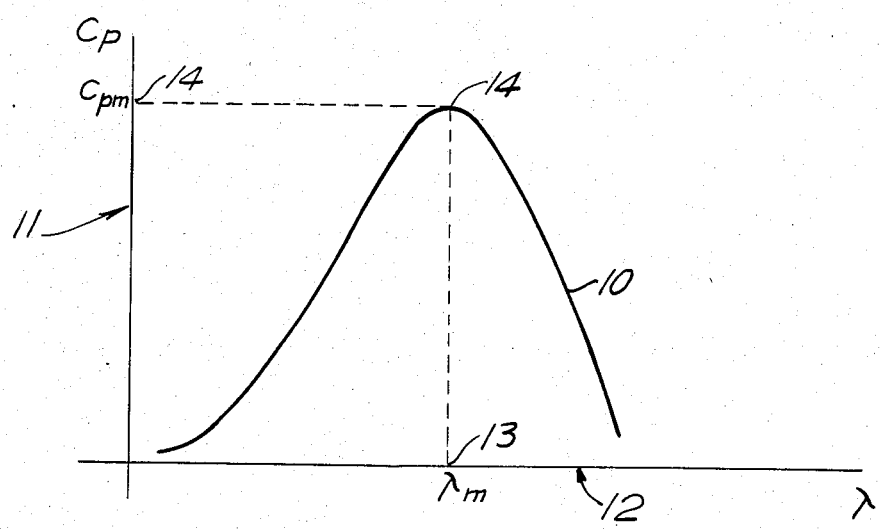
FIG. 1 is a graph showing a power coefficient ($C_p$) versus blade tip speed ratio ($\lambda$) curve for a typical wind turbine.

The curve 10 of FIG. 1 represents the relationship at fixed blade pitch between a typical wind turbine's power coefficient ($C_p$) 11, and the turbine's blade tip speed ratio ($\lambda$) 12. To allow the turbine to transfer a constant, maximum fraction of available wind power for fluctuating wind velocities incident upon the turbine's blade, it is desirable to maintain the tip speed ratio 12 at a constant value $\lambda_m$, shown at 13, which corresponds to the maximum power coefficient ($C_{pm}$) 14 of the turbine. Since the power output of a turbine at any given time is a function of its power coefficient at that time, by holding $\lambda$ constant at the value $\lambda_m$ for varying wind velocities, a turbine's power coefficient can be maintained at $C_{pm}$ so as to achieve maximum power output over the range of wind velocities. Since $\lambda$ is a function of the turbine's shaft velocity N, $\lambda$ can be held constant at the value $\lambda_m$ by adjusting the shaft speed of the wind turbine in proportion to changes in the wind velocity.

Figure 3:
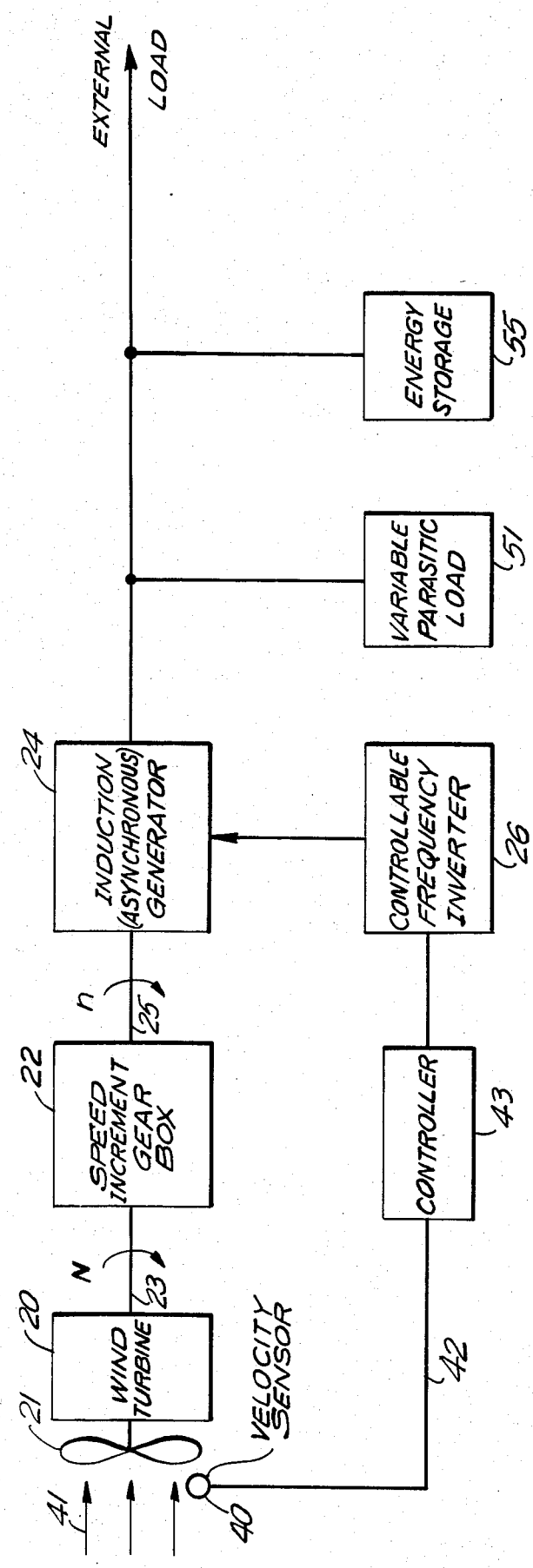
FIG. 3 is a block diagram showing the components of the present invention controlling a stand-alone wind power generating system.

FIG. 3 shows a typical stand-alone wind power generating system and one embodiment of the present invention used to control power transfer through the system.

The stand-alone system utilizes a wind turbine 20 having a blade 21. The turbine 20 drives a speed increasing gear box 22 by means of its shaft 23. The gear box 22 in turn drives an induction (asynchronous) generator 24 by means of a second shaft 25 interconnected between the gear box and the generator.

The generator's excitation is supplied by a static inverter 26 which can be varied in frequency. The wind system is operated so that the generator shaft speed is above synchronous speed by the "negative slip" necessary to generate electrical power. The frequency of the output voltage of the generator 24 is controlled by the frequency of the excitation voltage applied to the generator by the inverter 26. Thus, the shaft speed of the generator can be expressed as follows:

$$n = n_s \Big|_{f_i} (1 + s \Big|_p) \quad (6)$$

-continued where $n_s \Big|_{f_i}$ = synchronous rpm at inverter frequency, and $s \Big|_p$ = slip fraction related to available mechanical power.

In the preferred embodiment of the invention, s varies from 0 to about 0.03.

Figure 2:
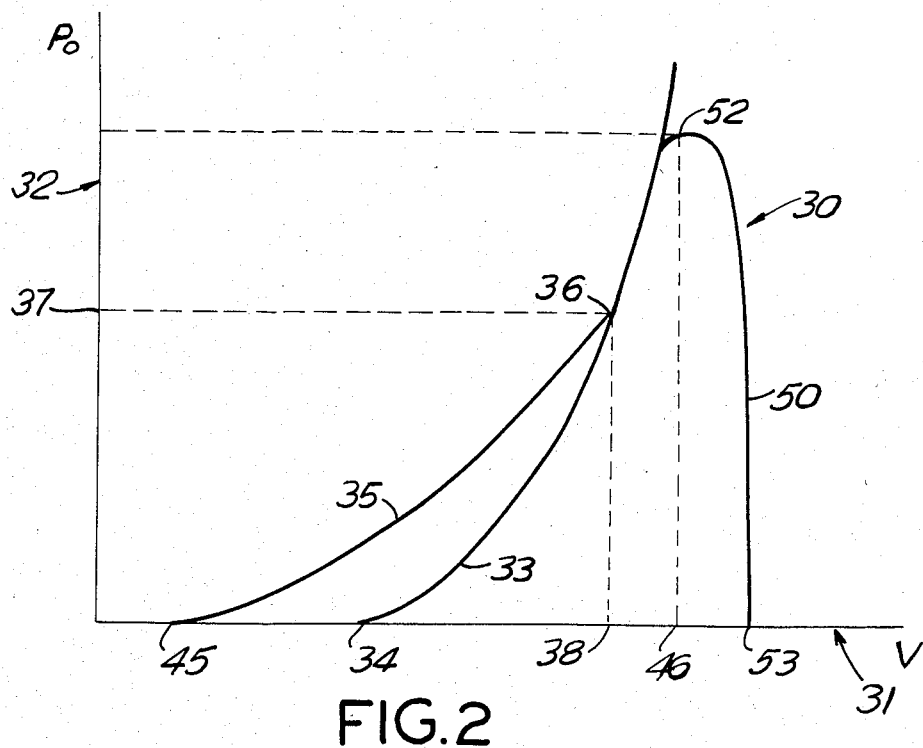
FIG. 2 is a graph showing power production versus wind velocity loci for three operating modes of the stand-alone wind power generating system used with the present invention.

FIG. 2 shows three system power production versus wind velocity loci 30. The horizontal axis of the graph of FIG. 2 represents the instantaneous velocity of the wind 31 incident upon the turbine blade 21 of the wind power generating system, while the vertical axis of the graph represents the power output 32 of the total system. It can be seen from loci 30 that the power output of the wind power generating system is a function of the velocity of the wind incident upon the system.

Loci 30 represent three different operating modes of the system. For example, locus 33 is the velocity-power locus of the system when it is operating with a constant excitation frequency applied to generator 24. Under this operating mode, the system "cuts in" or begins to produce sensible power at a wind velocity V 34 (see graph). Under this operating mode as the velocity of the wind incident upon the system increases, the output power of the system also increases proportionately.

Locus 35 is the velocity power locus of the system when the excitation frequency applied by inverter 26 to generator 24 is varied in response to changes in the velocity of the wind incident upon the turbine. The upper limit of the excitation frequency is set to correspond to a point 36 on power velocity locus 35 which represents a nominal power output, $P_o$ 37 at mean wind velocity V 38.

For power velocity locus 35, the operation of the present invention is as follows. A velocity sensor 40 senses the velocity of wind 41 incident upon blade 21 of turbine 20. This data is passed by velocity sensor 40 via a typical communication link 42 to a controller 43. After controller 43 receives the wind velocity data from sensor 40 it causes variable inverter 26 to adjust the excitation frequency applied to generator 24 so as to adjust the shaft speed of generator 24 in response to changes in the velocity of wind 41. Since the shaft of generator 24 is mechanically linked to shaft 23 of turbine 20 through shaft 25 and gear box 22, variations in the speed of generator 24's shaft will ultimately cause variations in the speed of turbine shaft 23.

Controller 43 is designed to implement equation (5) in that it seeks to constantly maintain a pre-determined ratio between the velocity of wind 41 and the speed of turbine shaft 23 by causing the excitation frequency applied to generator 24 to be varied accordingly. In the preferred embodiment controller 43 is a microcomputer. However, it is to be understood that other circuit configurations could also be used.

For initial system operation the excitation frequency is set at its upper limit so that the wind power generating system will generate nominal power output $P_o$ 37 for mean wind velocity V 38. Once the velocity of the wind 41 incident upon turbine 20 drops below the velocity V 38, velocity sensor 40 senses the change and transmits this fact to controller 43. Controller 43 in turn causes inverter 26 to adjust the excitation frequency applied to generator 24 so as to satisfy the requirements of equation (5). To the extent the system fulfills the requirements of equation (5) the system will produce maximum power for the wind available (locus 35).

The wind power generating system, when used in conjunction with the present invention, will "cut in" or begin to produce sensible power at a wind velocity V 45. As the velocity of wind 41 increases above wind velocity V 45 the excitation frequency provided by inverter 26 is adjusted so that the power output of the system continues to track locus 35. As the velocity of the wind increases toward a velocity V 38, controller 43 causes inverter 26 to increase the excitation frequency further so that the power output of the system continues to track locus 35. If the wind continues to increase in velocity beyond velocity V 38, controller 43 causes inverter 26 to hold the excitation frequency constant until the wind velocity reaches a clip velocity V 46. At V 46 the excitation frequency is reduced toward zero to assist in stalling the turbine. At this point the wind generating system begins to operate in accordance with locus 50.

Locus 50 of FIG. 2 represents the braking characteristics of the system. Once the velocity of wind 41 exceeds value V 46, sensor 40 informs controller 43 of this event. Thereafter, the controller causes inverter 26 to reduce the excitation frequency applied to generator 24 toward zero. Controller 43 also causes a parasitic load 51 to be increased. By combining a reduction of the excitation frequency with an increase in parasitic load 51, the speed of shaft 23 is dropped to zero. This is begun at a safe output power 52 and a safe wind velocity V 46, and completed at a wind velocity V 53. The reduction of the excitation frequency in combination with an increase in parasitic load 51 (needed in any case for stand-alone conditions) provides the frictionless braking needed to avoid operating the system at damaging, excessive wind speeds. The braking function shown in FIG. 2 as locus 50 is set so that no generator or turbine damage occurs and large load dump ratings are not needed. The result is that power output falls to zero (stalled turbine) at a wind velocity V 53 which is less than the maximum allowable stress wind velocity that the system is capable of handling.

During normal operation of the present invention, wind turbine 20 drives gear box 22 at a low speed, and generator 24 at a higher speed. In the preferred embodiment, typical values for 60 hertz excitation frequency operation are a turbine shaft speed of approximately 70 rpm, and a generator shaft speed of approximately 1,830 rpm. Because the generator's shaft is directly linked to the turbine's shaft, the relationship between the excitation frequency used to control the speed of the generator's shaft and the velocity of wind incident upon the turbine can be represented by a straight line.

The frequency of the output voltage generated by the system is set by the excitation frequency of inverter 26. Thus, the frequency of the output voltage will vary as the excitation frequency applied by the inverter to the generator is varied for control purposes.

For start-up of the system, inverter 26 is powered by an energy storage sub-system 55. However, during normal operation its power is supplied from generator 24. Under normal operating conditions generator 24 will provide electric power to an external load (not shown). Simultaneously, a portion of the power generated by generator 24 will be stored in energy storage sub-system 55. However, for conditions where the external load is satisfied, and energy storage sub-system 55 is fully charged, and available wind power exceeds demand, parasitic load 51 will absorb the balance of available power provided by generator 24.

Thus, according to the invention a wind power generating system operating in conjunction with the present invention will produce a variable frequency AC voltage which will track the frequency of the excitation voltage applied to generator 24. The excitation frequency must initially be set as a value that will avoid magnetic saturation in the generator and other iron core components of the system.

The major advantages of the present invention is that the amount of energy generated at relatively low wind speeds can be maximized. This makes it practical to use a stand-alone wind power generating system in locations where most of the wind energy available occurs at low wind velocities. In fact, while a typical stand-alone wind power generating system will begin producing sensible power at wind velocities of approximately 15 miles per hour, the wind power generating system shown in FIG. 3, when used in combination with the present invention, can begin producing sensible power at wind velocities of 6 miles per hour. The result is that the size of generator 24 and energy storage sub-system 55 may be significantly reduced because recharging will be more frequent, and less discharge energy will be expended.

The above-described embodiment of the invention is illustrative, and modifications thereof may occur to those skilled in the art. The invention is not limited to the embodiment disclosed herein, but is limited only as defined by the appended claims.

What is claimed is:

1. In a stand-alone wind power generating system having a wind turbine driving a generator connected to an external load and an energy storage device, the improvement comprising a maximum power tracking device comprising:
   means for measuring changes in the velocity of wind incident upon the turbine,
   means for applying an excitation frequency to the generator, said generator being an induction generator, and
   means for varying said excitation frequency in response to said wind velocity changes so that the shaft speed of the induction generator, and thereby of the wind turbine are adjusted to maintain a pre-determined ratio between said wind velocity incident upon the turbine and said turbine shaft speed.

2. A stand-alone wind power generating system capable of transferring a constant, maximum fraction of available wind power to an external load and an energy storage device comprising:
   a wind turbine,
   an induction generator driven by said turbine, and connected to the external load and energy storage device,
   means for applying an excitation frequency to said induction generator,
   means for measuring changes in the velocity of wind incident upon said turbine, and
   means for varying said excitation frequency in response to said wind velocity changes so that the shaft speed of said induction generator, and thereby of said turbine are adjusted to maintain a pre-determined ratio between said wind velocity incident upon the turbine and said turbine shaft speed.

3. A power generating system as recited in claims 1 or 2 further comprising means for dissipating excess power generated by the generator not consumed or stored by the external load or the energy storage device, respectively.

4. A power generating system as recited in claim 3 further comprising means for varying said dissipating means in response to changes in the power output of the generator or a wind velocity incident upon the turbine above a pre-determined velocity.

5. A power generating system as recited in claim 4 wherein said means for varying said dissipating means increases said dissipating means above a pre-determined value and said excitation frequency vary means decreases said excitation frequency to zero when said wind velocity incident upon said turbine exceeds a pre-determined value so that said turbine shaft speed is dropped to zero.

6. A power generating system as recited in claim 5 wherein said excitation frequency varying means and said means for varying said dissipating means are both a microcomputer.

7. A power generating system as recited in claim 6 wherein said measuring means is a wind sensor.

8. A power generating system as recited in claim 7 wherein said excitation applying means is a variable inverter.

9. A stand-alone wind power generating system capable of transferring a constant, maximum fraction of available wind power to an external load and an energy storage device comprising:
   a wind turbine having a blade thereon,
   an induction generator driven by said turbine, and connected to the external load and energy storage device,
   a variable inverter for applying excitation voltage of varying frequency to said induction generator,
   a wind velocity sensor for sensing the velocity of wind incident upon said blade, and
   a controller for measuring changes in the wind velocity sensed by said sensor, and for controlling said variable inverter to vary said frequency in response to said wind velocity changes so that the shaft speed of said induction generator, and thereby of said turbine are adjusted to maintain a pre-determined ratio between said wind velocity incident upon said blade and said turbine shaft speed.

10. A power generating system as recited in claim 9 further comprising a variable parasitic load connected to said induction generator to dissipate any excess power generated by said induction generator not consumed or stored by the external load or the energy storage device, respectively.

11. A power generating system as recited in claim 10 wherein said controller varies said variable parasitic load in response to changes in the power output from the induction generator or excessive wind velocity incident upon said blade.

12. A power generating system as recited in claim 11 wherein said energy storage device stores power generated by said induction generator.

13. A method of controlling the level of power transferred through a stand-alone wind power generating system utilizing a wind turbine driving a generator connected to an external load and an energy storage device comprising the steps of:
   measuring the velocity of wind incident upon the turbine,
   determining whether or not a change has occurred in said wind velocity, and if so,
   varying the excitation frequency applied to the generator in response to said change so that the shaft of the generator, and thereby of the turbine are adjusted to maintain a pre-determined ratio between said wind velocity incident upon the turbine and said turbine shaft speed, said generator being an induction generator.

14. A method of controlling the level of power transferred as recited in claim 13 further comprising the step of dissipating any excess power producted by the induction generator not consumed or stored by the external load or the energy storage device, respectively, with a dissipating means that is varied in response to changes in said excess power.

15. A method of controlling the level of power transfer as recited in claim 14 further comprising the steps of increasing said dissipating means and reducing said excitation frequency when said wind velocity incident upon said turbine exceeds a pre-determined value so that said shaft turbine speed is dropped to zero.

16. A power generating system as recited in claims 1 or 2 wherein said excitation frequency has a value corresponding to a nominal power output by the wind power generating system when said wind velocity is a mean value.

17. A wind power generating system as recited in claim 9 wherein said frequency of said excitation voltage is initially set at an upper limit so that the wind power generating system generates a nominal power output for a mean wind velocity.

18. A method as recited in claim 13 further comprising the step of initially setting said excitation frequency at an upper limit so that the wind power generating system generates a nominal power output for a mean wind velocity.

* * * * *